(12) United States Patent
Lehmann et al.

(10) Patent No.: US 6,260,573 B1
(45) Date of Patent: Jul. 17, 2001

(54) PIPE-DRILLING FITTING

(75) Inventors: Ernesto Lehmann, Schaffhausen (CH); Reinhard Muller; Bernd Schwarz, both of Singen (DE)

(73) Assignee: Georg Fischer Wavin AG, Subingen (CH)

( * ) Notice: Subject to any disclaimer, the term of this patent is extended or adjusted under 35 U.S.C. 154(b) by 0 days.

(21) Appl. No.: 09/612,474

(22) Filed: Jul. 7, 2000

(30) Foreign Application Priority Data

Jul. 14, 1999 (DE) ............................... 199 32 401

(51) Int. Cl.⁷ ............................ F16K 43/00; F16L 41/06
(52) U.S. Cl. ............................ 137/318; 30/93; 408/137
(58) Field of Search ..................... 137/318; 285/197; 30/93; 408/101, 111, 137

(56) References Cited

U.S. PATENT DOCUMENTS

| | | | |
|---|---|---|---|
| 2,839,075 | * 6/1958 | Mueller | 137/318 |
| 3,756,261 | * 9/1973 | Minchhoff | 137/318 |
| 4,029,118 | * 6/1977 | Merideth | 137/318 |
| 4,076,038 | * 2/1978 | Wynne | 137/318 |
| 4,258,742 | * 3/1981 | Louthan et al. | 137/318 |
| 4,655,480 | * 4/1987 | Thalmann | 137/318 |
| 5,076,318 | * 12/1991 | Fedora | 137/318 |
| 5,345,964 | * 9/1994 | Friedel | 137/318 |
| 5,348,045 | 9/1994 | Serve | 137/318 |
| 5,577,529 | * 11/1996 | Katz | 137/318 |
| 5,732,732 | 3/1998 | Gross et al. | 137/318 |
| 5,896,885 | 4/1999 | Svetlik | 137/318 |
| 5,975,117 | * 11/1999 | Schweitzer et al. | 137/318 |

FOREIGN PATENT DOCUMENTS

| | | |
|---|---|---|
| 3723898 | 1/1989 | (DE) . |
| 3830395 | 1/1990 | (DE) . |
| 19543681 | 6/1996 | (DE) . |
| 19630029 | 1/1998 | (DE) . |

* cited by examiner

*Primary Examiner*—George L. Walton
(74) *Attorney, Agent, or Firm*—Bachman & LaPointe, P.C.

(57) ABSTRACT

A pipe-drilling fitting for a medium-conveying pipe, comprising a housing which has a drilling stub, which can be fitted at an angle to the pipe axis, for drilling into the pipe wall, and a branch stub which is arranged at an angle to the drilling stub, a rotationally actuable cutting bush being arranged in the drilling stub, the cutting bush and the drilling stub having mutually complementary screw threads, and at least one sealing means for sealing the medium-conveying pipe with respect to the outside being provided between the drilling stub and the cutting bush, in which fitting the sealing means is arranged in the cutting bush on an external diameter which is significantly smaller than the internal diameter of the complementary screw threads.

7 Claims, 6 Drawing Sheets

PIPE-DRILLING FITTING

BACKGROUND OF THE INVENTION

The invention relates to a pipe-drilling fitting for a medium-conveying pipe, comprising a housing which has a drilling stub, which can be fitted at an angle to the pipe axis, for drilling into the pipe wall, and a branch stub which is arranged at an angle to the drilling stub, a rotationally actuable cutting bush being arranged in the drilling stub, the cutting bush and the drilling stub having mutually complementary screw threads, and at least one sealing means for sealing the medium-conveying pipe with respect to the outside being provided between the drilling stub and the cutting bush.

DE 196 30 029 A1 has disclosed a pipe-drilling fitting in which the cutting sleeve has both a cutting function and a sealing function. The sealing function is provided by elastic sealing rings which are arranged in radial grooves on the outside of the cutting bush, in the region of an external thread, and slide along a complementary internal thread on the drilling stub. The internal thread extends over a length which is longer by a multiple than the thickness of the sealing ring. Over this length, the internal screw thread can easily cut into and damage the elastic sealing ring as the components are repeatedly screwed in and out. The great length also leads to a considerable overall height.

It is an object of the present invention to provide a pipe-drilling fitting which is as simple and compact as possible and exhibits a maximum possible sealing function in all phases of use.

SUMMARY OF THE INVENTION

The foregoing object is achieved by the present invention wherein a pipe-drilling fitting is provided comprising a housing having a drilling stub, fitted at an angle to the pipe, for drilling into the pipe, and a branch stub which is arranged at an angle to the drilling stub, a rotationally actuable cutting bush arranged in the drilling stub, the cutting bush and the drilling stub having mutually complementary screw threads, and at least one sealing means for sealing the medium-conveying pipe with respect to ambient provided between the drilling stub and the cutting bush, wherein the sealing means between the drilling stub and the cutting bush is arranged radially inward of and at an axial distance from the complementary screw threads.

It is advantageous for the pipe-drilling fitting to be able to withstand as high a pressure as possible from the conveyed medium. This is achieved by the fact that the sealing means between the drilling stub and the cutting bush is arranged radially inward of and at a distance from the complementary screw threads. The force which acts on the elastic sealing means increases as the diameter of the sealing means becomes greater.

It is also advantageous for it to be possible to produce the pipe-drilling fitting as simply as possible. This is achieved by the fact that the sealing means between the drilling stub of the housing and the cutting bush is arranged in a uniform sealing region, which is at a distance from the screw thread, of the cutting bush. This is also achieved by the fact that the sealing region is formed on an inner wall of the cutting bush, and that the screw thread is designed as an external thread on an outer wall of the cutting bush. Assigning the functions of cutting, sealing, securing and driving to spatially separate regions ensures that the dimensioning of the cutting bush can be optimally adapted to the corresponding function of the various regions.

Furthermore, it is advantageous for the overall height of the pipe-drilling fitting to be as low as possible. This is achieved by the fact that the drilling stub has an annular holding pocket for holding the sealing region and the threaded region. Despite the addition of the sealing region, the overall height of the pipe-drilling fitting remains the same as or less than that of existing fittings.

BRIEF DESCRIPTION OF THE DRAWINGS

Exemplary embodiments of the invention are described with reference to the figures, in which.

DETAILED DESCRIPTION OF THE DRAWINGS

Figure 1:
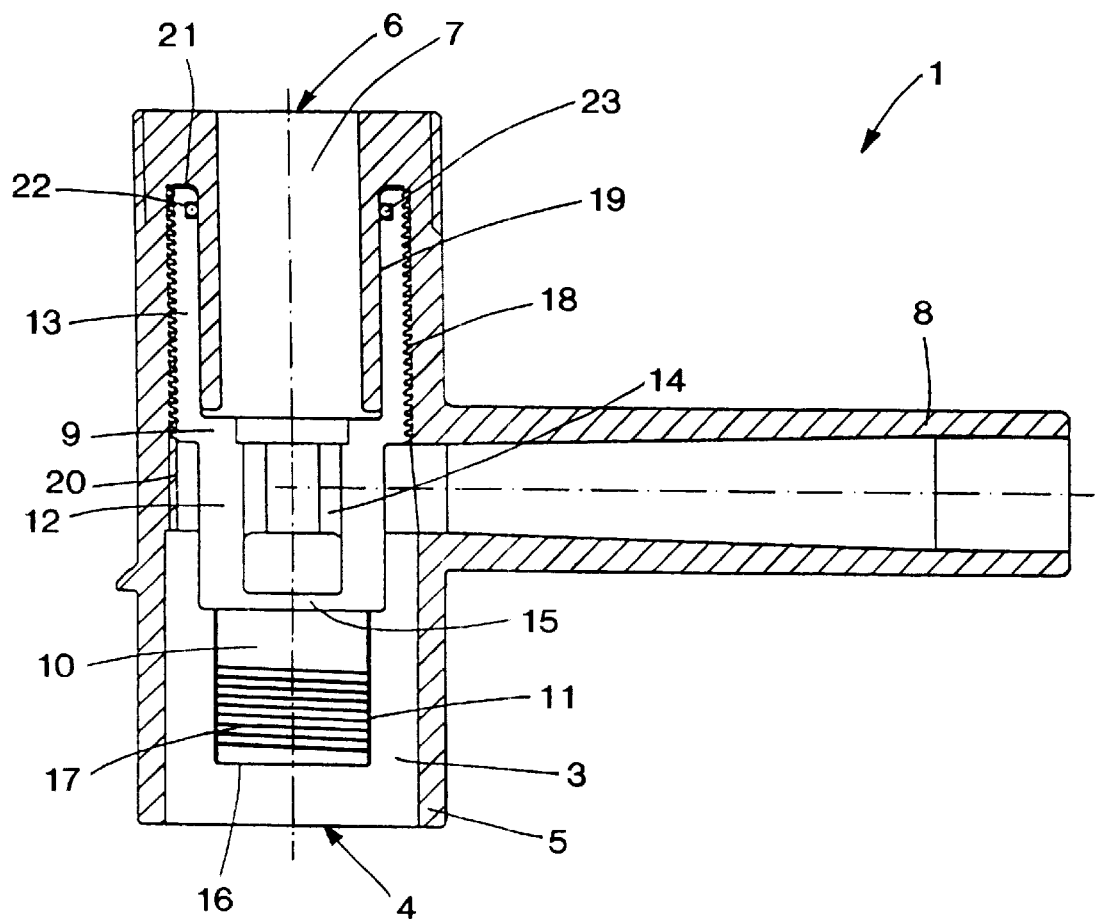
FIG. 1 shows a section through a pipe-drilling fitting according to the invention before a mediumconveying pipe is drilled into.

FIG. 1 shows a section through the middle of a pipe-drilling fitting 1. The pipe-drilling fitting 1 is substantially a pipe fitting with three outlets and with internals. The pipe-drilling fitting 1 comprises a housing 2, which has a drilling stub 3 which can be fitted at right angles to the axis of a mediumconveying pipe. The medium-conveying pipe is not shown here and may convey gas, water or some other medium. The pipe-drilling fitting 1 is used to branch off a branch pipe, for example a connection pipe for a house from a main pipe, for example a supply pipe buried below the road. The pipe-drilling fitting 1 can be used to carry out the connection without interruption to the supply of medium which is being conveyed in the main pipe and without loss of the medium. Particularly in the case of pipes which are carrying gas or chemicals, it is important, for reasons of environmental protection, to be able to work as far as possible without any loss of the medium.

At a bottom end 4, the drilling stub 3 has a connecting region 5, by means of which the drilling stub 3 can be connected to the pipe (not shown). The drilling stub 3 can be connected to the pipe using, for example, a pipe clip, in the case of plastic pipes using an electrically weldable hanger part, or using some other known joining process. An actuating opening 7 is shown at the top end 6 of the drilling stub 3. The actuating opening 7 provides access for a tool which has to be introduced into the drilling stub 3 in order to connect the pipe-drilling fitting 1 to the main pipe.

A branch stub 8 is arranged at an angle to the drilling stub 3. In FIG. 1, the branch stub 8 is arranged approximately at right angles to the drilling stub 3. However, angles of greater than or less than 90° are also conceivable, depending on the conditions at the installation site. This ensures that the connection pipe which is to be connected to the connection stub 8 can be connected to the main pipe as far as possible without a bypass. The connection pipe, which has likewise not been shown here, can be connected to the branch stub 8 using the same joining processes as those described above.

In FIG. 1, the pipe-drilling fitting 1 is shown in a state in which the fitting is supplied ready for installation at the construction site.

A cutting bush 9 is shown as an internal component inside the drilling stub 3. The cutting bush 9 is substantially a cylindrical component which is arranged concentrically inside the drilling stub 3. From the bottom upward, the cutting bush 9 comprises four regions: a cutting region 10, which is designed as a trepanning tool or a cutting sleeve 11, a driving region 12, in which a tool for actuating the cutting bush 9 can be accommodated, a threaded region 13, by means of which the cutting bush 9 can be moved axially and radially inside the drilling stub 3, and a sealing region 19 which is spatially separate from the threaded region 13 and seals the cutting bush 9 with respect to the drilling stub 3 of the housing 2.

Figure 6:
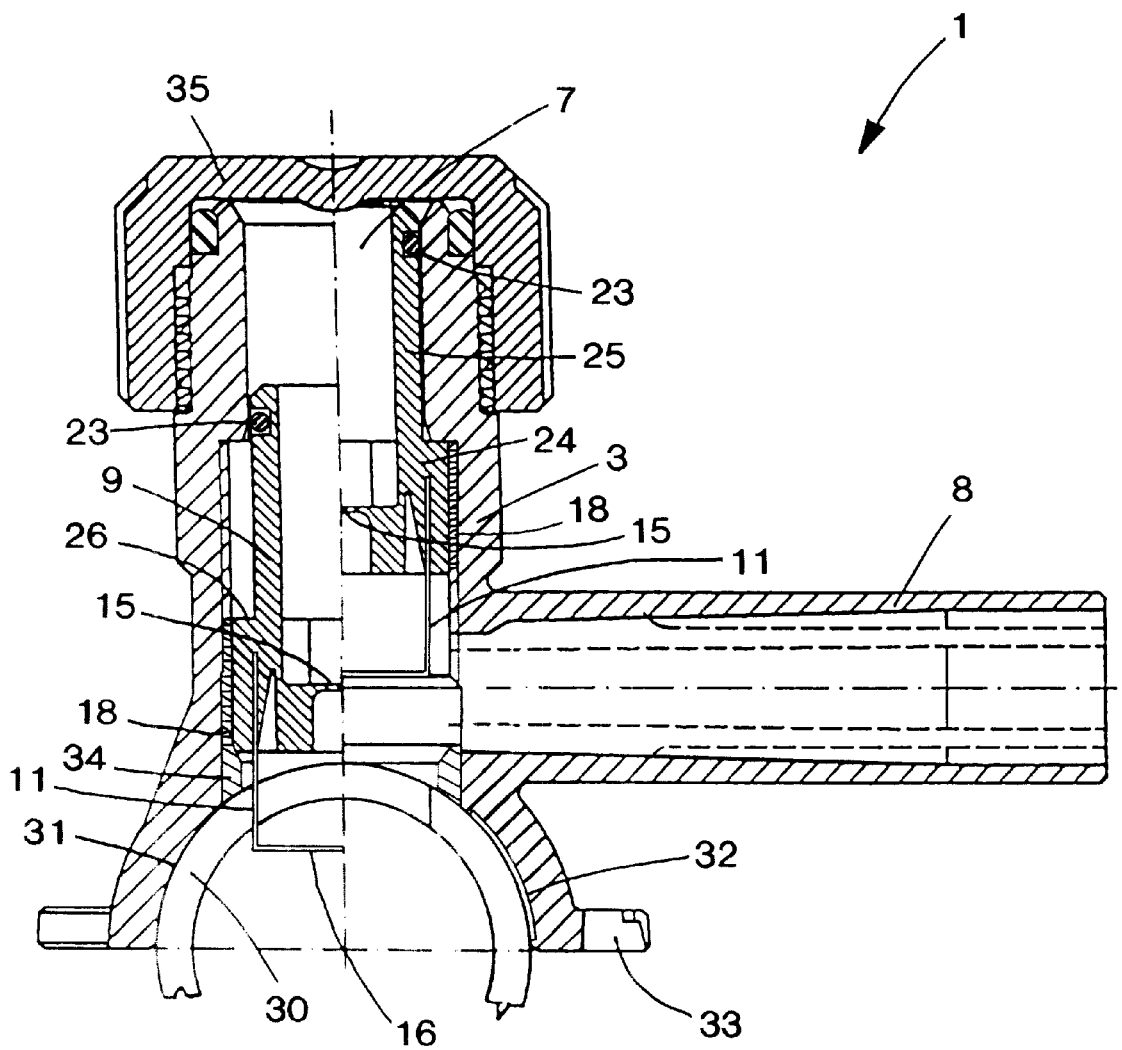
FIG. 6 shows a section through a further pipe-drilling fitting which is connected to a medium-conveying pipe.

On the inside, the driving region 12 has a tool receptacle 14. The tool receptacle 14 is designed in such a way that a tool which is introduced into the drilling stub 3 through the actuating opening 7 is enclosed by the tool receptacle 14. The tool may be a standard hexagon key or a special tool. This tool is used to screw the cutting bush 9 in or out with respect to the drilling stub 3, as is the case with a trepanning tool. The driving region 12 may also have a closure plate which prevents the medium from being able to flow out of the main pipe in the area of the actuating opening 7. The actuating opening 7 may additionally be closed off by means of a threaded cap or a closure cover, which is illustrated in FIG. 6.

The cutting sleeve 11 is made from a material which is suitable for cutting through the wall of the mediumconveying pipe. A cylindrical brass sleeve 11 with a ground cutting edge 16 is sufficient for plastic pipes made from polyethylene or polypropylene. Only the cutting region 10 is made from metal. The other regions of the cutting sleeve 9 may be made from the same plastics material as the housing 2 or from a compatible plastics material. If a more robust design is desired, the entire cutting bush 9 may also be made from the same material, for example brass. The cutting region 10 is designed to be as thin-walled as possible and on the inside accommodates the piece of plastic which has been cut out of the wall of the medium-conveying pipe. On the inside, the cutting sleeve 11 has a special screw thread 17 which is used to hold the piece of plastic which is cut out in the cutting sleeve 11 when the pipe is being cut into. The special screw thread 17 also prevents the piece of plastic which has been cut out of the pipe from tilting into a skew position inside the cutting bush 9 or even falling out of the cutting bush 9 into the pipe when the fitting is being unscrewed.

Like the cutting sleeve 11, the threaded region 13 is of cylindrical design, but is not necessarily made from metal or brass. By means of the threaded region 13, the cutting bush 9 is arranged rotatably and actuably in the drilling stub 3. The threaded region 13 of the cutting bush 9 has an external screw thread 18 on the outside and a sealing region 19 on the inside. The drilling stub 3 has an internal screw thread 20 which is complementary to the external screw thread 18 of the cutting bush 9.

Figure 2:
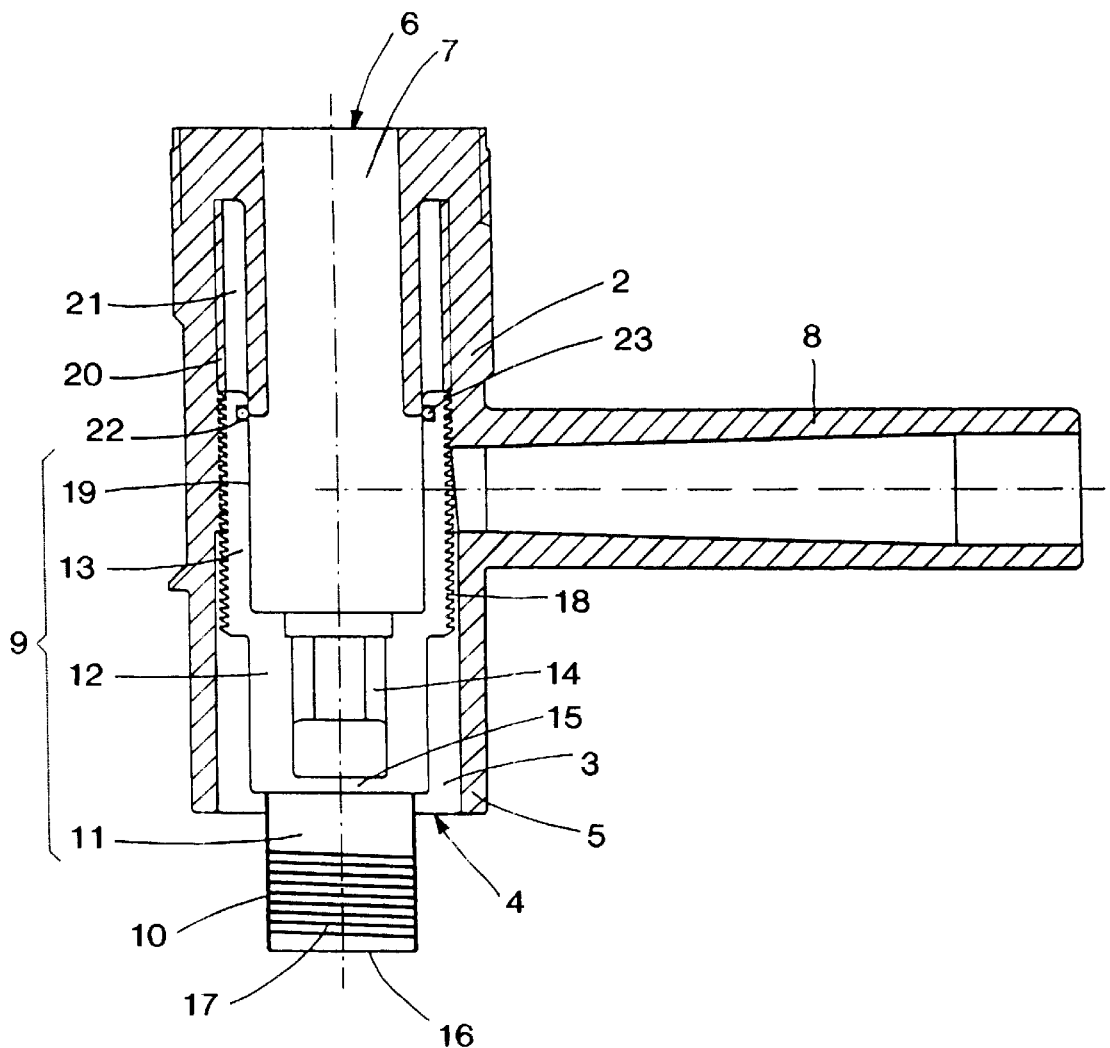
FIG. 2 shows a section through the pipe-drilling fitting from FIG. 1, in the state after the mediumconveying pipe has been drilled into.

In the exemplary embodiment shown in FIGS. 1 and 2, the drilling stub 3 has an annular holding pocket 21 which substantially holds both the entire sealing region 19 and the complementary screw threads 18, 20. The annular design of the holding pocket 21 ensures that both the sealing region 19 and the complementary screw threads 18, 20 can be arranged in the tightest possible space. This keeps the overall height of the pipe-drilling fitting 1 as small as possible.

The sealing region 19 of the cutting bush 9 has an annular groove 22 for holding a sealing means 23. The sealing means is, for example, a O-ring seal 23, which is available in many standard sizes. The annular groove 22 is arranged in the cylindrical sealing region 19, which is spatially separate from the complementary screw threads 18, 20 on the cutting bush 9. The fact that the sealing region 19 and the screw threads 18, 20 are spatially separate makes the cutting bush easy to produce and allows its dimensions to save on material. On the one hand, the wall parts which are responsible for the sealing function can be designed precisely for this task and on the other hand the wall parts which bear the screw threads 18, 20 can be designed precisely for that function. During production, this means that, in the example shown in FIGS. 1 and 2, the inner wall of the cutting bush 9 and that wall of the holding pocket 21 which lies closer to the center axis of the drilling stub 3 can be designed to be as smooth and uniform as possible. This results in the best possible sealing action between the drilling stub 3 and cutting bush 9, so that the pipe-drilling fitting 1 can be used even for high media pressures. The design of the annular holding pocket 21 of the drilling stub 3 with the internal screw threads 20 can be simplified by producing the drilling stub 3 in two individual parts. The production in individual parts enables the inside of the holding pocket to be machined or deformed more easily, after which the individual parts can be joined together by adhesive bonding, welding or screw connection to form an annular holding pocket 21. Instead of being arranged on the sealing region 19 of the cutting bush 9, the annular grooves 22 and the O-ring seals 23 may also be formed on the opposite wall regions of the drilling stub 3 of the housing 2.

The sealing means 23 is arranged on a diameter which is significantly smaller than the diameter of the complementary screw threads 18, 20. This further improves the sealing action of the fitting 1, since the forces acting on the sealing means 23 decrease as the diameter becomes smaller, It can be seen from FIGS. 1 and 2 that the largest diameter, i.e. the external diameter, of the O-ring seal 23 is smaller than the smallest diameter, i.e. the internal diameter, of the complementary screw threads 18, 20. Since the complementary screw threads 18, 20 have a relatively large diameter compared to the O-ring seal 23, actuation of the cutting bush 9 is also significantly facilitated. The advancing movement of the cutting bush 9, given an identical lead angle, per revolution increases proportionately to the diameter of the complementary screw threads 18, 20.

FIG. 2 once again shows the pipe-drilling fitting 1 from FIG. 1 in section, but in this figure in the position after the cutting bush 9 has been screwed fully into the wall of the medium-conveying pipe. In this position, the pipe has already been drilled into and, in the process, part of the pipe wall has been held in the cutting sleeve 10. It is possible to prevent the cutting bush from being screwed in too deeply by means of a stop. The figure shows how, in the screwed-in position, the cutting bush 9 is still guided and sealed by the holding pocket 21 of the drilling stub 3. As the next step, starting from this position, the cutting bush 9 is screwed back out until it reaches the position shown in FIG. 1. The tool for actuating the cutting bush 9 can be removed from the actuating opening 7. As an additional seal and to secure the arrangement against unauthorized access, the actuating opening can be closed off by means of a closure cap, which is illustrated in FIG. 6, or a threaded cover.

Figure 3:
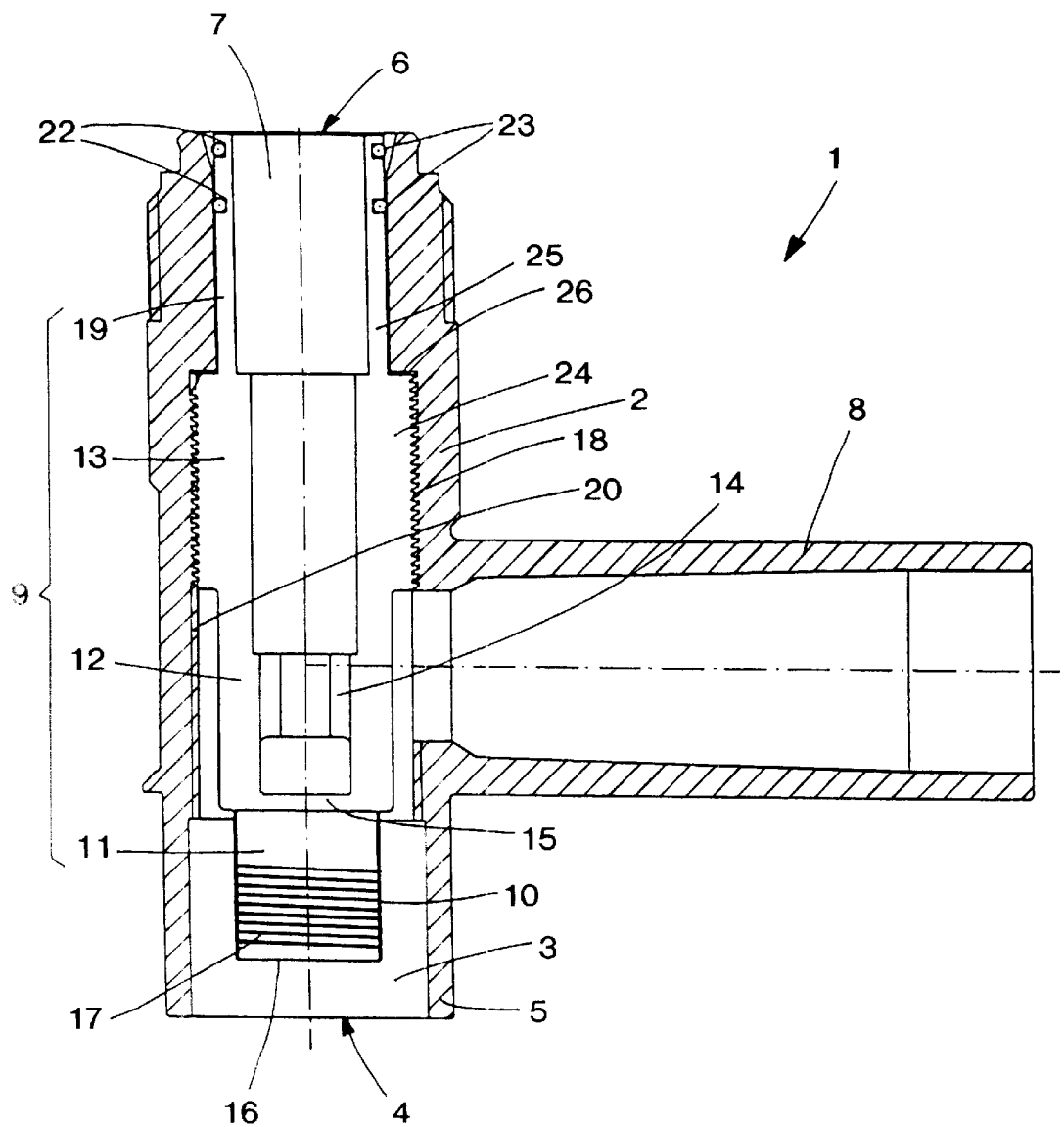
FIG. 3 shows a section through a further pipe-drilling fitting before a medium-conveying pipe is drilled into.
Figure 4:
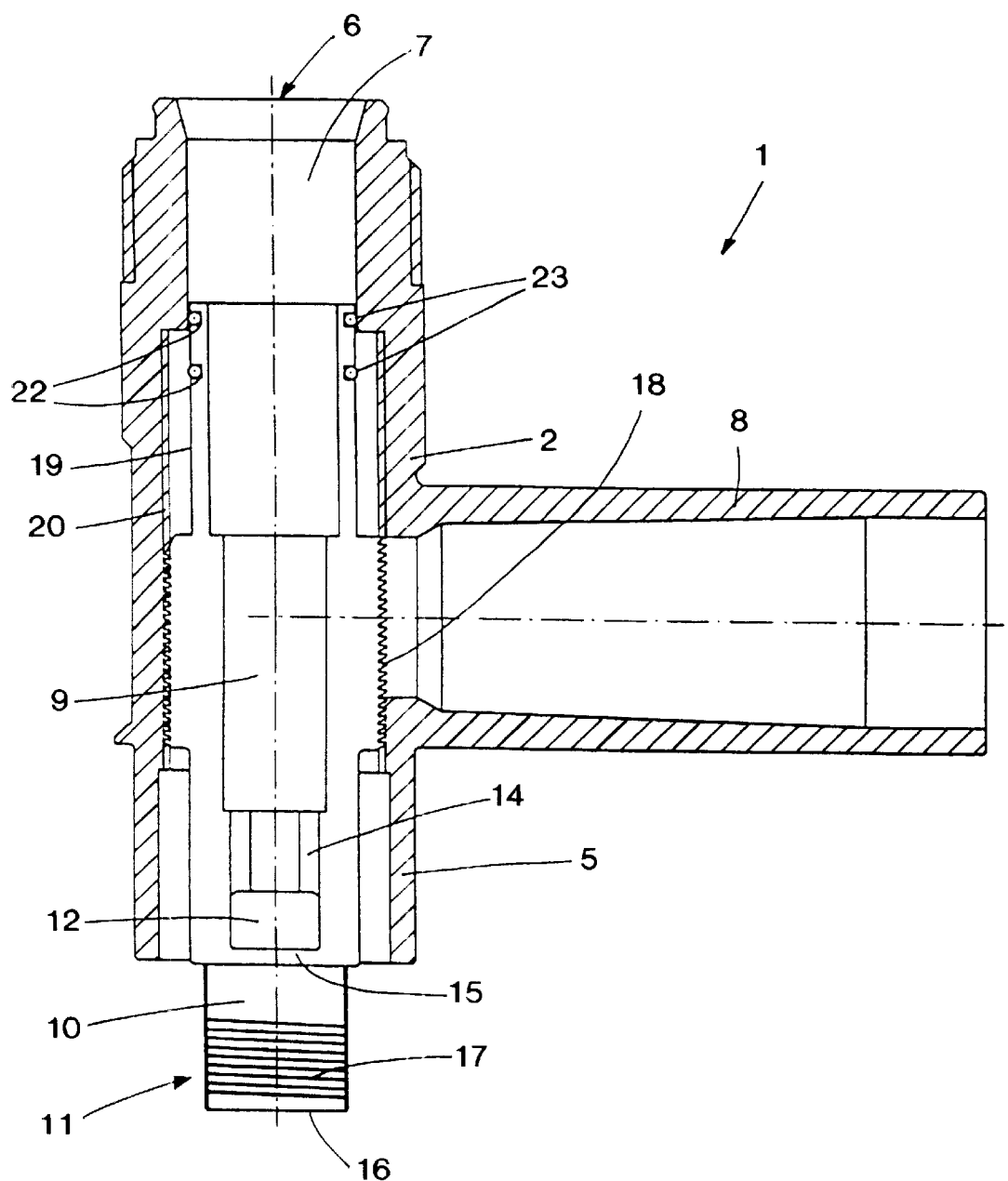
FIG. 4 shows a section through the pipe-drilling fitting from FIG. 3, in the state after the medium-conveying pipe has been drilled into.
Figure 5:
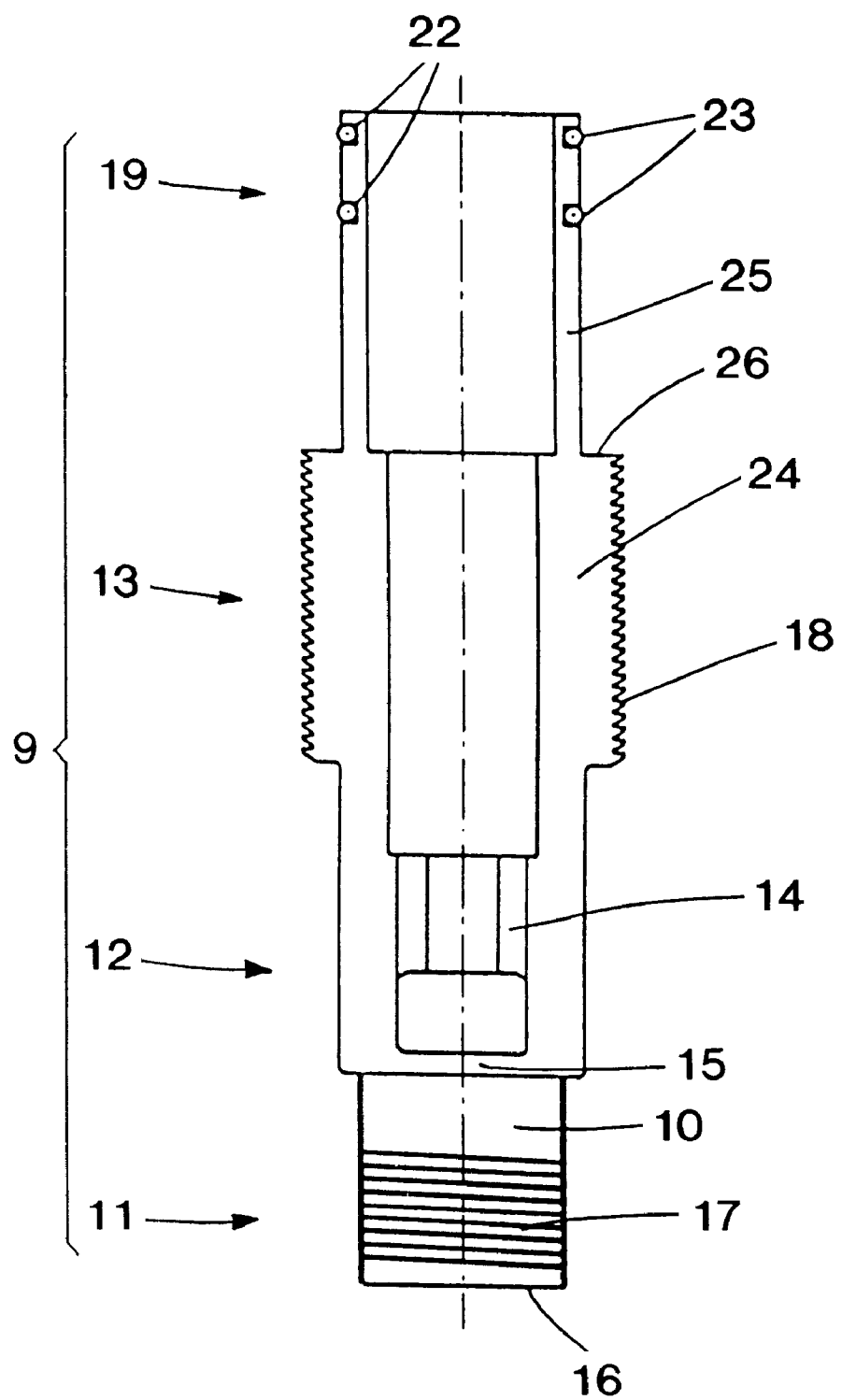
FIG. 5 shows a section through the cutting bush of the pipe-drilling fitting shown in FIGS. 3 and 4.

FIGS. 3 to 5 show a second exemplary embodiment of the pipe-drilling fitting 1 according to the invention. The design of the cutting bush 9 differs from that shown in FIGS. 1 and 2. In this case too, the sealing region 19 is spatially separate from the complementary screw threads 18, 20. In this embodiment, the spatial separation is even more pronounced than in FIGS. 1 and 2. In this arrangement, adjacent to the outer screw thread 18 which is formed on a first wall region 24 of the cutting bush 9, the cutting bush 9 also has a second wall region 25 which is connected to the first wall region 24 via a shoulder. The sealing means 23 is formed on this second wall region 25 of the cutting bush 9. The sealing means 23 is likewise arranged on a circle with an external diameter which is smaller than the internal diameter of the sealing region 19. The exemplary embodiment shown in FIGS. 3 to 5 is also distinguished by the fact that the cutting bush 9 is guided reliably while it is being screwed in and out.

The sealing action can be increased further by means of a second O-ring seal 23 in a second annular groove 22 in the sealing region 19 of the cutting bush 9. If the length ratios of the sealing region 19 and the complementary screw threads 18, 20 are dimensioned appropriately, and the annular grooves 22 with the O-ring seals 23 are arranged at the correct height, the overall height can be limited to a minimum.

FIG. 5 shows the cutting bush 9 from FIGS. 3 and 4 on its own. The individual regions of the cutting bush 9 can be clearly seen from this figure. These regions are, from the bottom upward, the cutting sleeve 11, the driving region 12 with the tool receptacle 14, the threaded region 13 with the external screw thread and the sealing region 19 with the annular grooves 22 and the O-ring seals 23.

FIG. 6 shows another pipe-drilling fitting connected to a medium-conveying pipe 30. The left-hand half of FIG. 6 shows the cutting bush 9 in a position in which the cutting bush 9 has cut fully through the medium-conveying pipe 30. The right-hand half of FIG. 6 shows the cutting bush 9 in a position in which the cutting bush 9 has fully opened the passage from the medium-conveying pipe into the branch stub 8. The drilling fitting 1 shown in FIG. 6 can be connected to the medium-conveying pipe 30 in a wide variety of ways. In FIG. 6, this is indicated by an adhesive bond 31, by an electrically welded joint 32 and by a pipe clamp half 33. During production, the cutting bush 9 is screwed into the pipe-drilling fitting 1 from below until it reaches the position shown in the right-hand half of FIG. 6. Then, a substantially annular insert 34 is introduced into the drilling stub 3, likewise from below. The insert 34 may be adhesively bonded, welded or screwed into the bottom end of the drilling stub 3. The insert 34 prevents the cutting bush 9 from being screwed too deeply into the pipe 30 when the pipe 30 is being drilled into. If the cutting bush 9 were to be screwed too deeply into the pipe 30, a sealing action would no longer be ensured at the top end of the cutting bush 9 and the medium would escape from the pipe 30 during the drilling operation. However, it is also possible to prevent the cutting bush from being screwed in too deeply by means of a special design of the bottom part of the screw thread 18.

The screw thread 18 can be cut so as to taper out, or the length of the screw thread 18 can be selected to be sufficiently short for the high torque which is required for the cutting operation to be transmitted only up to a defined position. This ensures that, below this defined position, the cutting bush 9 transmits no further torque and, as it were, slips freely.

A threaded cap 35 or a closure cover is also illustrated, at the top end of the drilling stub 3 in the region of the actuating opening 7. The threaded cap 35 additionally closes off the drilling fitting 1 after the drilling operation has taken place. The drilling fitting 1 is used wherever loss of medium is undesirable or may represent a danger to the environment.

What is claimed is:

1. A pipe-drilling fitting for a medium-conveying pipe, comprising a housing having a drilling stub, fitted at an angle to the pipe, for drilling into the pipe, and a branch stub which is arranged at an angle to the drilling stub, a rotationally actuable cutting bush arranged in the drilling stub, the cutting bush and the drilling stub having mutually complementary screw threads, and at least one sealing means for sealing the medium-conveying pipe with respect to ambient provided on a sealing surface of the cutting bush between at least a portion of the drilling stub and at least a portion of the cutting bush, wherein the sealing means between the drilling stub and the cutting bush is arranged radially inward of and at an axial distance from the complementary screw threads wherein the seal is maintained when a cap is placed on the drilling stub.

2. The pipe-drilling fitting as claimed in claim 1, wherein the sealing means between the drilling stub of the housing and the cutting bush is arranged in a uniform sealing region, which is at a distance from the screw thread, of the cutting bush.

3. The pipe-drilling fitting as claimed in claim 2, wherein the sealing region has an annular groove for accommodating the at least one sealing means.

4. The pipe-drilling fitting as claimed in claim 2, wherein the sealing region is formed on an inner wall of the cutting bush, and wherein the screw thread comprises an external thread on an outer wall of the cutting bush.

5. The pipe-drilling fitting as claimed in claim 2, wherein the drilling stub has an annular holding pocket for holding the sealing region and the complementary screw threads.

6. The pipe-drilling fitting as claimed in claim 1, wherein the screw thread is formed on a first wall region of the cutting bush, and wherein the sealing means is arranged on a second wall region of the cutting bush, the second wall region being inwardly offset with respect to the first wall region by means of a shoulder.

7. The pipe-drilling fitting as claimed in claim 1, wherein the drilling stub is formed integrally with the housing from a plastics material.

* * * * *